United States Patent
Yurgec et al.

(10) Patent No.: US 10,582,720 B2
(45) Date of Patent: Mar. 10, 2020

(54) BAKED SNACK COATING USING WAXY CORN STARCH

(71) Applicant: Corn Products Development, Inc., Sao Paulo (BR)

(72) Inventors: Matthew Yurgec, Bridgewater, NJ (US); Sergio Vargas Sanchez, Mexico City (MX)

(73) Assignee: Corn Products Development, Inc., Westchester, IL (US)

( * ) Notice: Subject to any disclaimer, the term of this patent is extended or adjusted under 35 U.S.C. 154(b) by 239 days.

(21) Appl. No.: 15/462,412

(22) Filed: Mar. 17, 2017

(65) Prior Publication Data
US 2018/0263268 A1    Sep. 20, 2018

(51) Int. Cl.
| | | |
|---|---|---|
| *A23L 19/00* | (2016.01) | |
| *A23L 7/10* | (2016.01) | |
| *A23L 25/00* | (2016.01) | |
| *A23P 20/10* | (2016.01) | |
| *A23L 29/212* | (2016.01) | |
| *A23L 11/00* | (2016.01) | |

(52) U.S. Cl.
CPC ............... *A23L 19/00* (2016.08); *A23L 7/198* (2016.08); *A23L 11/01* (2016.08); *A23L 25/25* (2016.08); *A23L 29/212* (2016.08); *A23P 20/105* (2016.08); *A23V 2002/00* (2013.01)

(58) Field of Classification Search
CPC ....... A23L 19/00; A23L 29/212; A23P 20/105
USPC ........................................................ 426/89
See application file for complete search history.

(56) References Cited

U.S. PATENT DOCUMENTS

| | | | |
|---|---|---|---|
| 7,294,355 B2 | 11/2007 | Roskam et al. | |
| 2003/0044488 A1 | 3/2003 | Roskam et al. | |
| 2004/0067282 A1 | 4/2004 | Karwowski et al. | |
| 2012/0077905 A1* | 3/2012 | Chen | C08L 3/06 523/447 |
| 2012/0258237 A1 | 10/2012 | Tsuchiya et al. | |
| 2013/0196103 A1* | 8/2013 | Leufgens | C08J 9/0061 428/36.5 |

FOREIGN PATENT DOCUMENTS

| | | | |
|---|---|---|---|
| CN | 103749926 | 4/2014 | |
| DE | 2453890 A1 | 5/1975 | |
| EP | 0438782 A2 | 12/1990 | |
| EP | 0480433 A2 | 10/1991 | |
| FR | 2905560 A1 * | 3/2008 | ............... A23C 9/13 |
| WO | WO00/054604 | 9/2000 | |
| WO | WO-03005828 A1 * | 1/2003 | ............. A23P 20/12 |
| WO | WO15/057789 A1 | 4/2015 | |

OTHER PUBLICATIONS

Gedeon, Hardness Testing Pitfalls, Brush Performance Alloys, 2011.

* cited by examiner

*Primary Examiner* — Jyoti Chawla
(74) *Attorney, Agent, or Firm* — Jacqueline Cohen; Jason Grauch; Rachael Casey

(57) ABSTRACT

A coated foodstuff is made using two starch components. One is a spray cooked agglomerated waxy corn starch as having a peak time to hydration viscosity of between about 5.5 and about 7.5 minutes. The snack has unique expansion and hardness properties compared to coatings made from other corn starches, in embodiments the snack has a coating that expands to between about 1.7 and about 2.6 mm, a hardness of between about 3000 and about 3750 grams, or a hardness-to-expansion ratio of about 1200:1 to about 2200:1 g/mm.

12 Claims, 2 Drawing Sheets

BAKED SNACK COATING USING WAXY CORN STARCH

BACKGROUND

Field of the invention: The present invention relates to snacks and food coatings made from corn starch based food coatings that expand on baking. More specifically the corn starch is a spray cooked, agglomerated waxy corn starch.

Corn starch is widely used in manufactured snack foods. It can be used as a sole starch component or is mixed with other starches and flours. Corn starch is well known to expand well during cooking, compared to other starch, like tapioca. But corn starch tends to make softer foodstuffs. It is desirable to have a corn starch that retains its favorable expansion characteristics but produces a harder snack.

SUMMARY

This specification discloses coated foodstuffs. The coat foodstuff comprises an edible substrate and at least one layer of a coating made from spray cooked agglomerated waxy corn starch and a second starch or flour. The spray cooked agglomerated waxy corn starch can be further characterized as having a time to peak hydration viscosity of between about 5.5 and about 7.5 minutes. In embodiments the snack foods can be further characterized by having coating that expands between about 1.7 and about 2.6 mm during baking. In embodiments the snack foods can be further characterized by having a baked coating with a hardness of between about 3000 and about 3750 grams. In embodiments snack food can be further characterized by having a coating with a hardness-to-expansion ratio of about 1200:1 to about 2200:1 g/mm embodiments the edible substrate may be a nut, legume, or other vegetable. In embodiments the edible substrate has a moisture content of less than about 5% by weight.

DETAILED DESCRIPTION

Figure 1:
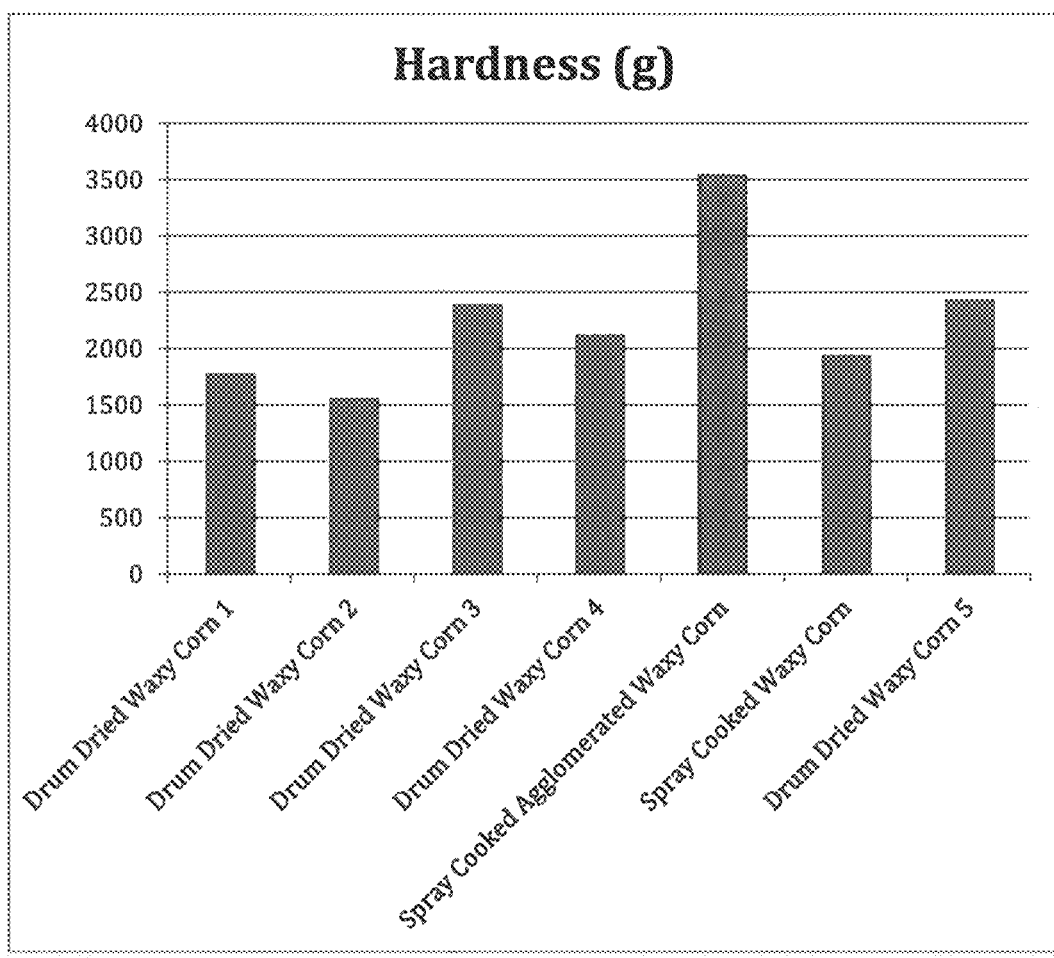
FIG. 1 is a graph charting the hardness of coating made from various preparations of waxy corn starch.

As used herein a waxy starch is derived from plants that naturally have low levels of amylose. The plants may be as found in nature, genetically modified, or bred through controlled breading programs. The waxy starch of this invention have less than 10% by weight amylose, in embodiments less than 5%, in embodiments less than 3%, and in embodiments essentially 0% amylose.

As used herein an agglomerated starch is a starch composition comprising two or more starch particles bound together with a binding agent. Non-limiting examples of binding agents used in the art include sugar syrups, maltodextrin, water, and modified starch that have been at least partly dissolved in water. Such modified starch can be modified by pregelatinization, cross-linking, stabilization, hydrolysis or a combination thereof.

As used in herein unmodified, with regard to a starch or flour, means that the starch or flour is not modified in any way such as by chemical, physical or enzymatic modification; a pregelatinized starch is a modified starch.

A used herein cake flour means one of a commercially available class of wheat flours that are bleached and are typically finer than commercially available all-purpose flours. Additionally, cake flour typically has a relatively low percentage, by eight of protein (around 8% versus 10%) compared to all-purpose flour.

As used herein the term coating expansion refers to height of the coating measured from the inside edge of the coating to its outside edge after baking.

As used herein low protein flour refers to flours having no more than about 8% protein by weight.

Spray cooked agglomerated starch is pregelatinized starch made by a spray cooking process. Spray Cooking is a process of cooking starch in a spray nozzle with mixture of steam/slurry plus pressure followed by direct atomization into the spray chamber either as a fine particle that could be rewet agglomerated later or agglomerated within the spray dryer at the point of atomization.

Unless said otherwise, all ratios or percentages are by weight.

The coating textures disclosed in this specification are obtained using a spray cooked agglomerated waxy corn starch. The starch had a peak time to hydration viscosity of between 5.5 and 7.5 minutes. In embodiments the time to peak hydration viscosity is between about 6 and 7 minutes. In embodiment the agglomerated starch has a median particle size ($d_{50}$) of between about 150 and 250 microns, in embodiments between 175 and 225 microns. In embodiments the spray cooked agglomerated waxy corn starch has a particle size distribution characterized by a $d_{10}$ (10% of particles being smaller than) of between 50 and 100 microns embodiments between 50 microns. In embodiments the $d_{90}$ (90% of particles being smaller than) is between 325 and 425 microns, preferably between 350 and 400 microns. In embodiments the spray cooked agglomerated waxy corn starch has a volume mean particle size (D [4,3]) of between about 100 and 300 microns, in embodiments between 150 and 250 microns.

Atomization during spray cooking controls for particle size. Size distribution of the agglomerated starches may also be controlled by using appropriate screening methods.

As disclosed herein starch dry mix coatings for foodstuffs use a first starch which is spray cooked agglomerated waxy corn starch. The coatings are primarily a mixture of the first starch and second starch (which maybe a flour). In preferred embodiments the second starch is wheat flour, or other gluten containing flour, preferably cake flour or other low protein flour—i.e. flour having no more than about 8% protein by weight. The first and second are mixed in a ratio of between 3:1 and 1:3. Additional ingredients may be added to the mix as desired such as chemical leavening agents like bicarbonate salts, for example sodium bicarbonate, and ammonium bicarbonate. Such leavening agents may also contain acid salts such as calcium phosphate, or ammonium sodium sulfate. They may also contain tartaric acid. Such leavening agents will typically be used in an amount ranging from about 0.1% to about 1% by weight of the coating composition. Coatings may also include sugar in an amount of from about 10% to about 40% of the dry mix. The dry mix may also use other seasoning and flavorings commonly used in the snack foods including but not limited to salt.

The dry mix coating is applied to a foodstuff substrate with an adhesion liquid such as water, or syrup made from sugar, gums, modified starches and starch derivatives, maltodextrins and the like. Preferred syrups include simple syrups comprising sugar and water. Sugar can be dissolved in water in a weight ratio of between about 1:4 sugar to water to about 4:1 sugar to water. In embodiments the sugar to water ratio is about 1:1. The syrup may also include other water soluble components such as salt or chemical leavening agents of the types described above.

Foodstuffs are coated using suitable method. Preferably, a pan coater may be used to coat the peanuts with adhesion liquid and starch coating. This allow for alternate coats of adhesion liquid and starch mix. The coater applies substantially uniform coatings to the substrate. The substrate may be coated more than once, by alternately coating it with adhesion liquid and coating mix. In embodiments of the invention more than 1 coating is used. In other embodiments more than 5 coatings are use. In other embodiments more than 10 coatings are use.

Coated food stuffs are baked in any type of industrial oven such as conventional ovens, fluidized bed reactors and driers, mixers and blenders equipped with heating devices, and other types of heaters. Foodstuffs are baked at temperatures between 130° C. and 190° C. More preferably between 150° C. and 180° C., and more preferably around 170° C. Foodstuffs are baked for between 10 and 60 minutes more typically between 20 and 30 minutes, and more typically around 25 minutes. In embodiments the coated food stuff is baked for 22 minutes, In embodiments the coated foodstuffs can be further characterized by having a coating that expands to between about 1.7 and about 2.6 during baking, in embodiments 2.0 and about 2.5 mm, in other embodiments between 2.125 and 2.375 mm, in other embodiments between about 2.2 and 2.3 mm.

In embodiments the coating on the coated foodstuffs can be further characterized by a hardness of between about 3000 and about 3750 grams, in other embodiments between about 3250 and about 3500 grams.

In embodiments coating on the coated foodstuffs can be further characterized by a hardness-to-expansion ratio of about 1200:1 to about 2200:1 g/mm, in other embodiments 1500:1 to about 1600:1 g/mm, in other embodiments between about 1550:1 and about 1575:1 g/mm.

Although some examples are specifically described as peanut coatings, the invention is not so limited. Any foodstuff may be used as substrate for the coating. Non-exclusive examples include nuts (e.g. including almonds, cashews, etc.) seeds (e.g. sunflower seeds, fennel seeds, pumpkin seeds, etc.), legumes (peanuts, peas, etc.) and vegetables or any other foodstuff appropriate for coating. Typically the food stuff is dried, has a native moisture level, or is of a composition so that little moisture transfers from the foodstuff to the coating prior to or during baking. Typically such foodstuffs are fully cooked before coating and baking, and have moisture content of less than 5%.

Although preferred embodiments use wheat flour as the second starch the invention is not so limited. The spray cooked agglomerated starch may be mixed starch or flour from with oats, saga, corn, tapioca, pea or other pulse flours, barley, amaranth, arrowroot, canna, quinoa and sorghum, and waxy (i.e. low amylose), and high amylose variant of the above starch sources. The second starch or flour is preferable not pregelatinized, and more preferably is not modified in any way. In other embodiments the second starch or flour may be modified using standard modifications such as etherification, esterification, cross-linking, conversion, annealing, heat moisture treatment, thermal inhibition, and the like.

Procedural

Hardness measurements: Baked coatings were evaluated for hardness using a TA-XTPlus Texture Analyzer (Texture Technologies, Hamilton, Mass.) equipped with analytical software (Stable Microsystems, Surrey, UK). A 3 point bend rig was used for the measurement. The base of the rig had a 20 mm gap. The blade was 3 mm in diameter with a rounded edge. Conditions are as follows:

| Test Mode | Compression |
| --- | --- |
| Pre-test Speed | 5 mm/sec |
| Test Speed | 20 mm/sec |
| Post-test Speed | 10 mm/sec |
| Target Mode | Distance |
| Distance | 15 mm |
| Trigger Type | Auto |
| Trigger Force | 20 grams |
| Load Cell | 5 kg |

The measurements taken for the peak force required to break the coating (in grams) and the distance to break (mm). A total of 30-35 samples were tested in order to get a full view of standard deviation (which typically ranged between 10-20%). After taking the measurements, the data was put through Minitab statistical software to remove outliers. A One-way ANOVA test with Tukey's LSD was used to identify statistical product groupings.

Volume measurements: Measured by measure volume of a defined number of whole coated peanut crackers (80 pieces) in a graduated cylinder.

Coating expansion measurements: Measured by hand using calipers. Results are based on averaged the thickness of 80 pieces that had been slice open and measure from out surface of coating to inner surface of coating. As used herein the term coating expansion refers to height of the coating measured from the inside edge of the coating to its outside edge after baking, Hydration viscosity measurements: Measurements by Brabender® Micro Visco-Amylo-Graph® (manufactured by Brabender® GmbH & Co. KG, Duisburg, Germany). Measurements were made on a starch slurry of 4.5% starch solids, at pH 4. The slurry was heated to 30° C. for 5 minutes, increased to 95° C. and held for 1.5 minutes, and then cooled back down to 30° C. Time to peak viscosity is measured from the starting of mixing of the starch into solution (at 30° C.) until slurry reaches peak viscosity.

Particle size: The particle size of the spray cooked agglomerated waxy corn starch was measured by laser diffraction using a Malvern Mastersizer® 2000.

Comparative modified corn starches.

TABLE 1

| Sample No | Starch type |
| --- | --- |
| 1 | Drum dried waxy corn starch 1 |
| 2 | Drum dried waxy corn starch 2 |
| 3 | Drum dried waxy corn starch 3 |
| 4 | Drum dried waxy corn starch 4 |
| 5 | Spray cooked agglomerated waxy corn |
| 6 | Spray cooked waxy corn starch |
| 7 | Drum dried waxy corn starch 5 |

EXAMPLE 1

Peanut coatings were prepared as follows. The coating process required preparation the coating material, adhesion compound and peanuts.

Coating mixture: Starch and flour were mixed until homogenous.

Adhesion syrup: Surcose and water were mixed, and then heated until sucrose was completely dissolved. The syrup was cooled for use as the adhesive.

Peanuts, dry mix coating and adhesive syrup were prepared according to the recipe listed in Tables 2 and 3

TABLE 2

| Component | Weight Percent of Total |
| --- | --- |
| Syrup | 33% |
| Peanuts | 32% |
| Coating | 35% |

TABLE 3

| Component | Weight Percent of Total |
| --- | --- |
| Syrup | |
| Sucrose | 65% |
| Water | 35% |
| Coating | |
| Starch | 50% |
| Wheat Flour | 50% |

To coat the peanuts, peanuts, coating and syrup were divided into 7 parts. Peanuts were then placed in a pan coater. One part syrup and coating were added to coater. Peanuts, syrup and coating were mixed for 7 minutes. This was repeated for the other 6 parts. Coated peanuts were baked in an oven for 25 minutes at 130°C. The baked food was removed from the oven and cooled for 30 minutes before packing.

Figure 2:
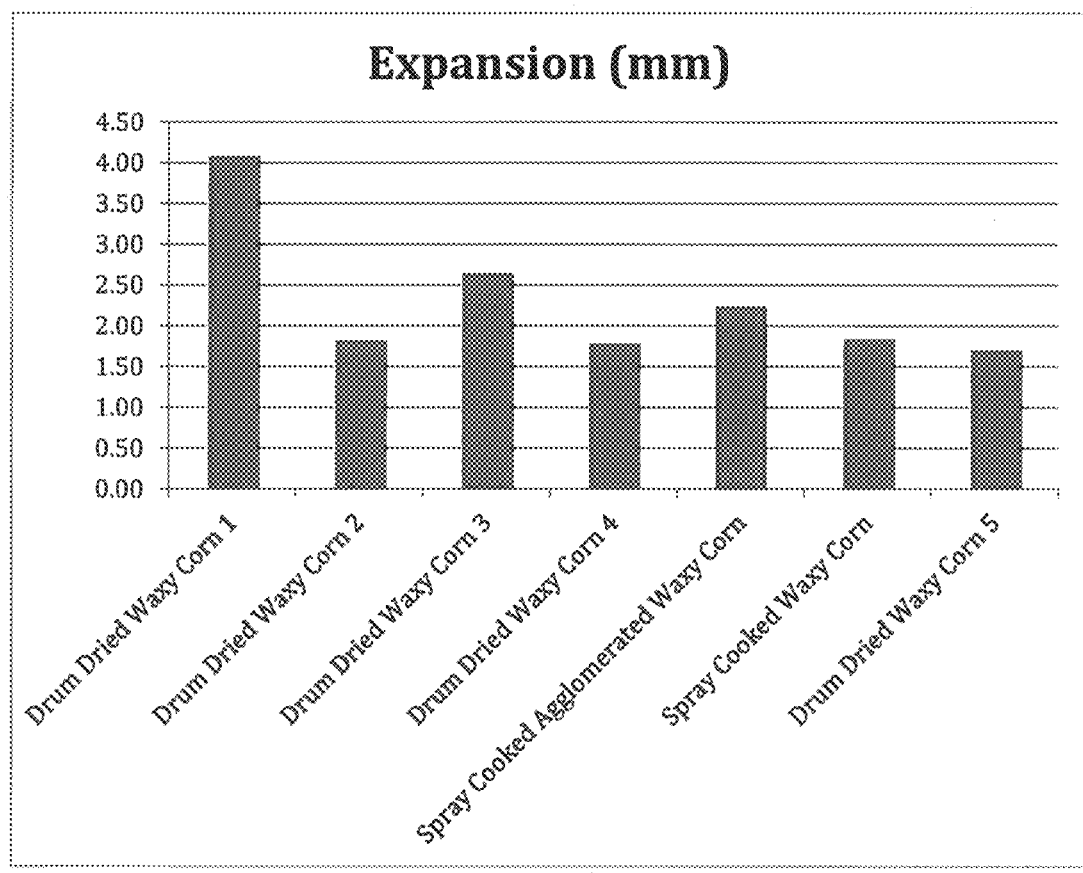
FIG. 2 is a graph charting the amount of expansion of coatings made from various preparations of waxy corn starch.

FIGS. 1 and 2 show that spray cooked agglomerated waxy corn starch expanded to about 2.25 mm and a hardness of about 3500 g.

What is claimed is:

1. A coated foodstuff comprising:
   an edible substrate having a moisture content of less than about 5% by weight; and
   a coating comprising at least one layer of a mixture comprising
   a first starch characterized by being a spray cooked agglomerated waxy corn starch having a time to peak hydration viscosity of between 5.5 and 7.5 minutes; and
   a second starch being a starch or flour; and
   wherein the first and second starch are mixed in a weight ratio of between about 3:1 and about 1:3.

2. The coated foodstuff of claim 1 having a coating characterized by an expansion of between about 1.7 and about 2.6 mm.

3. The coated foodstuff of claim 1 having a coating characterized by a hardness of between about 3000 and about 3750 grams.

4. The coated foodstuff of claim 1 having a coating characterized by a hardness-to-expansion ratio of about 1100:1 to about 2200:1 g/mm.

5. The coated food stuff of claim 1 wherein the edible substrate is a nut, seed, legume, or vegetable.

6. The coated foodstuff of claim 1 wherein the second starch is wheat flour.

7. The coated foodstuff of claim 1 wherein the second starch is a wheat flour and wherein the coating has a hardness-to-expansion ratio of about 1100:1 to about 2200:1 g/mm.

8. The coated foodstuff of claim 1 wherein the second starch is a native wheat flour and wherein the coating has a hardness-to-expansion ratio of about 1100:1 to about 2200:1 g/mm.

9. The coated foodstuff of claim 1 wherein a test coating of the coated foodstuff consisting of 2 to 10 layers of equal parts spray cooked agglomerated waxy corn starch and unmodified wheat flour, each layer adhered to one or more peanuts with a syrup of sucrose and water, and each layer adhered in a pan-coater for seven minutes, the plurality of layers making coated foodstuff having a coating that is characterized by a hardness-to-expansion ratio of about 1500:1 to about 1600:1 g/mm when the coated foodstuff is baked for 25 minutes at 130° C.

10. The coated food stuff of claim 1 wherein the spray cooked agglomerated waxy corn starch has a $d_{50}$ of between 150 and 250 microns.

11. The coated food stuff of claim 1 wherein the spray cooked agglomerated waxy corn starch has a $d_{10}$ of between 50 and 100 microns and a $d_{90}$ of between 325 and 425 microns.

12. The coating of claim 1 wherein the second starch is a gluten free starch.

* * * * *